US007248167B2

(12) United States Patent
Wassingbo

(10) Patent No.: US 7,248,167 B2
(45) Date of Patent: Jul. 24, 2007

(54) METHODS, COMPUTER PROGRAM PRODUCTS, MOBILE TERMINALS, AND WEB PAGES FOR PROVIDING DIRECTIONAL INFORMATION ASSOCIATED WITH RFID ENABLED MOVEABLE OBJECTS

(75) Inventor: Tomas Wassingbo, Lund (SE)

(73) Assignee: Sony Ericsson Mobile Communications AB, Lund (SE)

( * ) Notice: Subject to any disclaimer, the term of this patent is extended or adjusted under 35 U.S.C. 154(b) by 193 days.

(21) Appl. No.: 11/070,784

(22) Filed: Mar. 2, 2005

(65) Prior Publication Data

US 2006/0208925 A1 Sep. 21, 2006

(51) Int. Cl.
*B60R 25/00* (2006.01)
(52) U.S. Cl. .................................... 340/572.1
(58) Field of Classification Search ............. 340/10.33, 340/572.1, 10.52, 990, 988, 995.1, 539.11, 340/539.13, 539.2, 5.92, 10.42; 235/491; 705/22, 28; 342/357.01, 357.07; 455/456.1
See application file for complete search history.

(56) References Cited

U.S. PATENT DOCUMENTS

| 4,445,118 | A | 4/1984 | Taylor et al. .......... 342/357.09 |
| 5,418,538 | A | 5/1995 | Lau ....................... 342/357.15 |
| 5,663,734 | A | 9/1997 | Krasner ................. 342/357.12 |
| 5,663,735 | A | 9/1997 | Eshenbach ............. 342/357.15 |
| 5,936,527 | A * | 8/1999 | Isaacman et al. ........ 340/572.1 |
| 6,246,882 | B1 | 6/2001 | Lachance |
| 6,433,735 | B1 | 8/2002 | Bloebaum et al. ........ 342/357.1 |
| 6,977,612 | B1 * | 12/2005 | Bennett ................. 342/357.07 |
| 7,005,968 | B1 * | 2/2006 | Bridgelall ................ 340/10.42 |
| 7,038,573 | B2 * | 5/2006 | Bann ......................... 340/10.1 |
| 2002/0177490 | A1 * | 11/2002 | Yong et al. ................. 473/353 |
| 2003/0011511 | A1 | 1/2003 | King et al. ............ 342/357.02 |
| 2003/0095032 | A1 | 5/2003 | Hoshino et al. |
| 2004/0056779 | A1 * | 3/2004 | Rast .......................... 340/985 |

FOREIGN PATENT DOCUMENTS

| JP | 2004287713 | 10/2004 |
| WO | WO 02/31525 A1 | 4/2002 |
| WO | WO 03/007257 A1 | 1/2003 |

OTHER PUBLICATIONS

"Radio Frequency Identification—RFID: A Basic Primer" <http://www.aimglobal.org/technologies/rfid/resources/papers/rfid_basics_primer.asp > version 1.11, Sep. 28, 1999, 13 pages.

(Continued)

*Primary Examiner*—Brent A. Swarthout
(74) *Attorney, Agent, or Firm*—Myers, Bigel, Sibley & Sajovec, P.A.

(57) ABSTRACT

A method of providing directional information associated with moveable objects can include periodically receiving identification (ID) information at a mobile terminal from a moveable object via a Radio Frequency Identification (RFID) signal. Location information associated with the ID information can be updated to provide updated location information for the moveable object. Updating the location information can be ceased when the moveable object is out of RFID range of the mobile terminal to maintain the updated location information as the most recently known location information for the moveable object.

18 Claims, 8 Drawing Sheets

OTHER PUBLICATIONS

ECMA International "Near Field Communication: White Paper" 9 pages (2004).
Lindsay et al.; *RFID Locating Systems for Linking Valued Objects with Multimedia Files*; http://www.jefflindsay.com/rfd2.shtml; pp. 1-14; Mar. 2, 2005.
Raghu Das; *An Introductuion to RFID and Tagging Technologies*; IDTechEx 2004, pp. 1-6; 2004.
International Search Report and Written Opinion for PCT/EP2006/001559; Date of mailing Sep. 7, 2006.

* cited by examiner

METHODS, COMPUTER PROGRAM PRODUCTS, MOBILE TERMINALS, AND WEB PAGES FOR PROVIDING DIRECTIONAL INFORMATION ASSOCIATED WITH RFID ENABLED MOVEABLE OBJECTS

BACKGROUND

Radio Frequency Identification (RFIDs) refers to the use of low-cost "tags" embedded in or attached to items that can store "bar code" type information, as well as more detailed information about the items. The tags are generally small labels, or the like, with a miniature embedded antenna. A tag reader interrogates the tag by transmitting an RFID signal, which energizes the embedded antenna to provide power for the tag to transmit a responsive RFID signal to the reader.

Various commercial applications have been suggested for RFID tags, particularly in the area of retail marketing and sales. For example, RFID technology may be used to gather information related to consumer trends, purchasing habits, consumption rates, etc. It is also known to use RFID technology in the areas of inventory control, manufacturing process and control, product accountability and tracking systems, etc. Manufacturers, shippers, and retailers may be able to follow a given product through their respective systems from initial production through to point of sale using RFID tags. It has been suggested that other applications may include shopping carts that automatically charge a bank account, refrigerators that connect to the Internet to automatically reorder items, and interactive televisions linked to such refrigerators that will feed targeted commercials and special offers to consumers.

RFID readers have been incorporated into various electronic devices such as Personal Data Assistants (PDAs) and mobile cellular telephones.

SUMMARY

Embodiments according to the invention can provide methods, computer program products, mobile terminals, and web pages for providing directional information associated with Radio Frequency Identification (RFID) enabled moveable objects. Pursuant to such embodiments according to the invention, a method of providing directional information associated with moveable objects can include periodically receiving identification (ID) information at a mobile terminal from a moveable object via an RFID signal. Location information associated with the ID information can be updated to provide updated location information for the moveable object. Updating the location information can be ceased when the moveable object is out of RFID range of the mobile terminal to maintain the updated location information as the most recently known location information for the moveable object.

In some embodiments according to the invention, the mobile terminal periodically receives unique Identification (ID) Information from RFID tags coupled to moveable objects, such as a wallet, a briefcase, a set of keys, etc. The mobile terminal can determine Location Information, using for example GPS, which is associated with the ID Information for each moveable object. As the location information is periodically determined, it is used to update the location information for the moveable objects. This can continue periodically for each of the moveable objects if the moveable object remains within RFID range to receive and transmit to the mobile terminal.

If a user suspects that a moveable object has been lost or misplaced, the user can access the location information using the mobile terminal to provide directional information that is based on the most recently known location information for the moveable object which may have been lost/misplaced. In some embodiments according to the invention, the directional information can be provided by a map on the display of the mobile terminal showing the most recently known location information for the moveable object. In other embodiments according to the invention, the directional information may be shown as an address which may be determined by referring to a database to translate, for example, GPS information stored in the location information table to an address. The location information can also include a time at which the most recently known location information for the moveable object was established. The user may refer to the time to gain further insight into where the moveable object may have been misplaced or dropped.

DESCRIPTION OF EMBODIMENTS ACCORDING TO THE INVENTION

Figure 1:
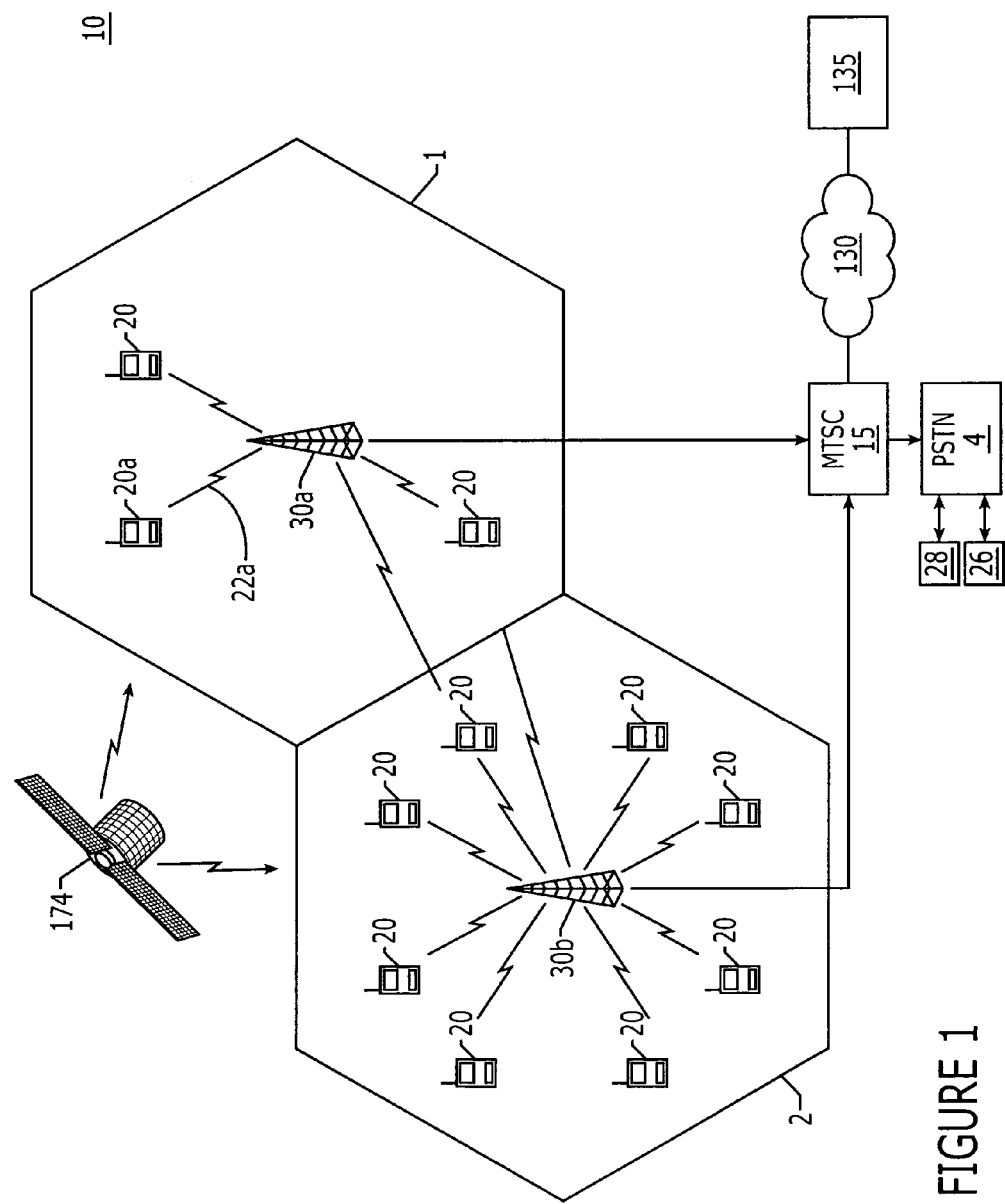
FIG. 1 is a schematic illustration of a wireless communications network that provides service to mobile terminals according to some embodiments of the invention.

The invention is described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should be emphasized that the term "comprises/comprising" when used in this specification is taken to specify the presence of stated features, integers, steps or components but does not preclude the presence or addition of one or more other features, integers, steps, components or groups thereof.

It will be understood that although the terms first and second may be used herein to describe various components these components should not be limited by these terms. These terms are only used to distinguish one component from another. Thus, for example, a first component discussed below could be termed a second component without departing from the teachings of the present invention.

The invention is described with reference to flowcharts and block diagrams of mobile terminals, communications networks, and operations thereof according to embodiments of the invention. It will be understood that each block of the flowcharts and/or block diagrams, and combinations of blocks, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or schematic block or blocks.

It will be understood that the invention may be practiced with any mobile terminal that operates in a communications network. A mobile terminal may be, for example, a single or dual mode cellular radiotelephone with or without a multi-line display; a Personal Communications System (PCS) terminal that may combine a cellular radiotelephone with data processing, facsimile and data communications capabilities; a Personal Data Assistant (PDA) that can include a mobile terminal, pager, Internet/intranet access, Web browser, organizer, calendar and/or a global positioning system (GPS) receiver; and a conventional laptop and/or palmtop receiver or other appliance all of which include a radiotelephone transceiver.

It will be understood mobile terminals according to the invention may operate in any type of wireless communications network. In some embodiments according to the invention, for example, the network may provide services broadly labeled as PCS (Personal Communications Services) including advanced digital cellular systems conforming to standards such as IS-136 and IS-95, lower-power systems such as DECT (Digital Enhanced Cordless Telephone), data communications services such as CDPD (Cellular Digital Packet Data), and other systems such as CDMA-2000, that are proposed using a format commonly referred to as Wideband Code Division Multiple Access (WCDMA).

As described herein in greater detail, in some embodiments according to the invention, the mobile terminal periodically receives unique Identification (ID) Information from RFID tags coupled to moveable objects, such as a wallet, a briefcase, a set of keys, etc. The mobile terminal can determine location information, using for example GPS, which is associated with the ID Information for each moveable object. As the location information is periodically determined, it is used to update the location information for the moveable objects. This can continue periodically for each of the moveable objects if the moveable object remains within RFID range to receive and transmit to the mobile terminal.

If a user suspects that a moveable object has been lost or misplaced, the user can access the location information using the mobile terminal to provide directional information that is based on the most recently known location information for the moveable object which may have been lost/misplaced. In some embodiments according to the invention, the directional information can be provided by a map on the display of the mobile terminal showing the most recently known location information for the moveable object. In other embodiments according to the invention, the directional information may be shown as an address which may be determined by referring to a database to translate, for example, GPS information stored in the location information table to an address. The location information can also include a time at which the most recently known location information for the moveable object was established. The user may refer to the time to gain further insight into where the moveable object may have been misplaced or dropped.

FIG. 1 is a diagram that illustrates a wireless communications network (network) 10 that supports communications in which mobile terminals 20 according to the invention can be used. Networks 10 are commonly employed to provide voice and data communications to subscribers using, for example, the standards discussed above. According to FIG. 1, the mobile terminals 20 can communicate with each other via a Mobile Telephone Switching Center (MTSC) 15. The mobile terminals 20 can also communicate with other terminals, such as terminals 26, 28, via a Public Service Telephone Network (PSTN) 4 that is coupled to the network 10. As also shown in FIG. 1, the MTSC 15 is coupled to a server 135 via network 130, such as the Internet. The server can be used to serve Web pages including a location information table according to some embodiments of the invention.

The network 10 is organized as cells 1-2 that collectively can provide service to a geographic region. In particular, each of the cells can provide service to associated sub-regions included in the geographic region covered by the network 10. More or fewer cells can be included in the network 10, and the coverage area for the cells may overlap. Each of the cells may include an associated base station 30a-b. The base stations 30a-b can provide wireless communications between each other and the mobile terminals 20 in the associated geographic region to allow for communications therebetween.

Each of the base stations 30a-b can transmit/receive data to/from the mobile terminals 20 over an associated control channel. For example, the base station 30a in cell 1 can communicate with the mobile terminal 20a over the control channel 22a. The control channel 22a can be used, for example, to page the mobile terminal 20a in response to calls directed thereto or to transmit traffic channel assignments to the mobile terminal 20a over which a call associated therewith is to be conducted. The control channels 22 can be identified using control channel numbers or identifiers. For example, the mobile terminal 20a can store a channel number that identifies control channel 22a as the control channel on which it is currently camping.

The mobile terminals 20 may also be capable of receiving messages from the network 10 over the respective control channel 22. In some embodiments according to the invention, the mobile terminals receive Short Message Service (SMS) or Enhanced Message Service (EMS) formatted messages, Multimedia Message Service (MMS), and/or Smartmessaging™ formatted messages.

A Global Positioning System (GPS) 174 can provide GPS information to the geographic region including cells 1-2 so that the mobile terminals 20 may determine location information. The location information can be applied to identification information received by the mobile terminals from RFID tags to update the location of moveable objects that are coupled to the RFID tags. As described herein in greater detail, the network 10 may also provide network location information as the basis for the location information applied by the mobile terminals.

Figure 2:
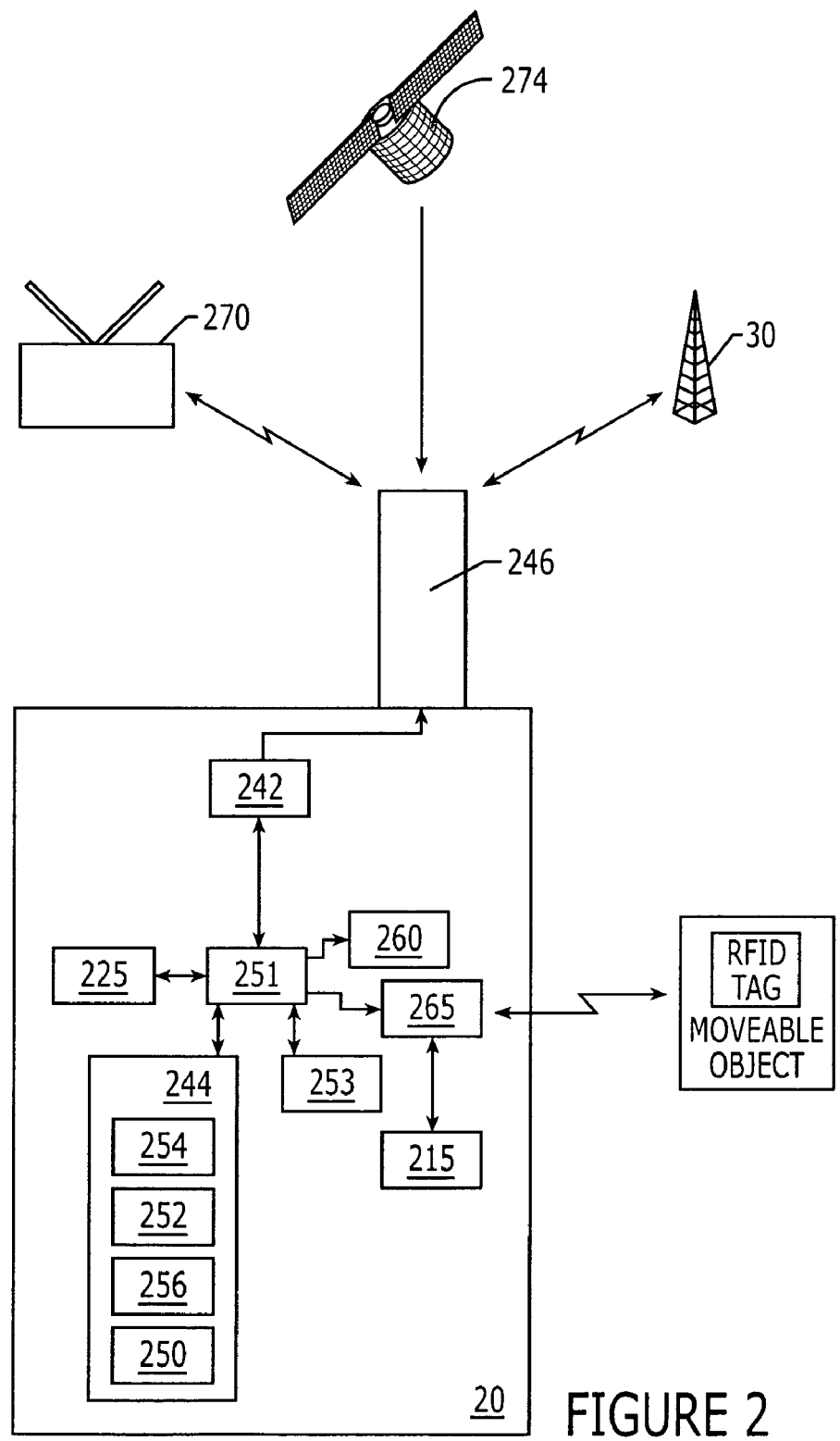
FIG. 2 is a schematic block diagram that illustrates mobile terminals according to some embodiments of the invention.

FIG. 2 is a block diagram that illustrates embodiments of mobile terminals 20 according to the invention. As illustrated in FIG. 2, the mobile terminal 20 includes a transceiver circuit 242 that is operative to transmit and receive radio frequency communication signals to the network 10 via an antenna system 246. The antenna system 246 may include an antenna feed structure and one or more antennas.

As is well known to those of skill in the art, a transmitter portion of the transceiver 242 converts information, which is to be transmitted by the mobile terminal 20, into electromagnetic signals suitable for radio communications. A receiver portion of the transceiver 242 demodulates electromagnetic signals, which are received by the mobile terminal 20 from the network 10 to provide the information contained in the signals in a format understandable to the user.

A user interface 244 of the mobile terminal 20 may include a variety of components, such as a display 254, a keypad 252, a speaker 256, and a microphone 250, operations of which are known to those of skill in the art. It will be understood that the functions of the keypad 252 and the display 254 can be provided by a touch screen through which the user can view information, such as computer displayable documents, provide input thereto, and otherwise control the mobile terminal 20. It will be understood by those skilled in the art that computer displayable documents (or Web pages) can be, for example, hypertext documents, which can include text, images, input fields, output fields, and a variety of other objects.

A processor circuit 251 provides for overall operation of the mobile terminal 20 including coordination of communications via the transceiver circuit 242, the user interface 244, and other components included in the mobile terminal 20. For example, the processor circuit 251 can provide communications signals to the transceiver circuit 242 when the user speaks into the microphone 250 and receives communications signals from the transceiver 242 for the reproduction of audio through the speaker 256. The processor circuit 251 can generate characters for display on the display 254. For example, the processor circuit 251 can generate numbers for display when the user enters a telephone number on the keypad 252. The characters can also be generated by a character generator circuit, which is not shown.

The processor circuit 251 may be implemented using a variety of hardware and software. For example, operations of the processor circuit 251 may be implemented using special-purpose hardware, such as an Application Specific Integrated Circuit (ASIC) and programmable logic devices such as gate arrays, and/or software or firmware running on a computing device such as a microprocessor, microcontroller or digital signal processor (DSP). The processor circuit 251 may provide digital signal processing operations such as scanning for an acceptable control channel, camping on a control channel (including maintaining synchronization with the base station that communicates with the mobile terminal 20), Voice Activated Dialing (VAD) services, performing media operations and the like.

The mobile terminal includes a Radio Frequency Identification (RFID) interface circuit 265 that can transmit RFID signals to the RFID tags and can periodically receive identification (ID) information that uniquely identifies the RFID tags coupled to moveable objects. RFID refers to the use of radio frequency signals to read information stored in a small device, sometimes referred to as an "RFID tag." The "tag" can be attached to the moveable objects and may be any shape/size that can be incorporated into/on the moveable objects. The moveable objects can be wallets, keys, mobile telephones, clothing, automobiles, and may even be included in printed inks on, for example, paper. Other moveable objects can also incorporate RFID tags.

The information stored in the tag can be identification (ID) information that can uniquely identify the moveable object associated with the tag. For example, two different moveable objects can have respective tags that each store different ID information that can be used by the mobile terminal to distinguish the two moveable objects. It will be understood that the RFID interface circuit 265 includes an RFID antenna (not shown) via which the RFID signals are transmitted/received. The RFID antenna can be included in the antenna system 246 or can be a separate structure (internal or external). The mobile terminal 20 can also include an RFID tag 215 that includes ID information that uniquely identifies the mobile terminal 20 (as a moveable object according to some embodiments of the invention).

In operation, the ID information stored in the RFID tag can be "read" by transmitting an RF signal from the RFID interface circuit 265 to energize an RF antenna associated with the tag, if the tag is within transmit range of the RFID interface circuit 265. Once energized, the tag transmits an RFID signal including the ID information stored in the tag using a tag transmitter circuit. It will be understood that the energy imparted to the tag antenna can be used to power the tag transmitter circuit and ancillary circuits used by the tag to transmit. Accordingly, the tag may not require a battery or other on-board power source, which are sometimes referred to as passive RFID tags. The RFID interface circuit 265 can receive the RFID signal transmitted by the tag (if within range of the tag transmitter) including the ID information that uniquely identifies the moveable object. The RFID tags are discussed further, for example, on the Internet at idtechex.com/pdfs/en/O7289Z3822.pdf, which is hereby incorporated herein by reference.

The mobile terminal 20 includes a location determination circuit 260 that is configured to determine the location information for a movable object based on the ID information received from the moveable object via an RFID interface circuit 265. In some embodiments according to the invention, the location determination circuit 260 is a Global Positioning System (GPS) location circuit, including a GPS receiver circuit, that uses, for example, any available GPS or assisted GPS based location approach in conjunction with a GPS satellite system 274. Such approaches are commonly referred to as assisted-GPS, which is defined, for example, in specification numbers 3GPP TS 04.31, 3GPP TS 03.71 and 3GPP TS 04.35. Assisted-GPS approaches are also discussed, for example, in U.S. Pat. Nos. 4,445,118, and 5,418,538, and 5,663,734, and 5,663,735, and 6,433,735, and in published US Patent Application No. US 2003/0011511 A1, the disclosures of which are hereby incorporated herein by reference.

In some alternative embodiments according to the invention, the location determination circuit 260 is a network location circuit that uses location information provided by the network 10, such as a base station ID, that has location information associated therewith. In some other embodiments according to the invention, the location determination circuit 260 is a local area network location circuit that uses location information provided via the local wireless network 270 (through a local wireless interface circuit not shown) to determine the location information for the moveable objects.

Other location determination approaches may be used. In some embodiments according to the invention, the local area network is a WLAN compliant network. In some other embodiments according to the invention, the local wireless network 270 is a Bluetooth compliant interface. In any event, the local wireless network 270 can be used to provide information to the location determination circuit 260 to determine the location information that can be applied to the moveable objects in communication with the mobile terminal 20.

A memory 253 can store computer program instructions that, when executed by the processor circuit 251, carry out the operations described herein and shown in the figures. The memory 253 can be non-volatile memory, such as EEPROM (flash memory), that retains the stored data while power is removed from the memory 253. The memory 253 can also store a location information table including location information, such as most recently known location information/time information as to when the most recently known location information was established, settable/clearable alarm flags, other IDs, and other location information according to embodiments of the invention.

The mobile terminal 20 includes an alarm circuit 225 that is configured for selective activation when a moveable object (with an RFID tag) moves beyond the range of the RFID interface circuit 265. In particular, if the settable/clearable alarm flag associated with a particular moveable object is in the set state, the alarm circuit 225 will be activated if the corresponding moveable object moves beyond the range of the RFID interface circuit 265. Alternatively, if the settable/clearable alarm flag associated with a moveable object is in the cleared state, the alarm circuit 225 is not activated when the moveable object moves beyond the range of the RFID interface circuit 265. It will be understood that the alarm circuit 225 can be configured to produce any type of alarm that can be perceived by the user such as a vibrating alert or an audible tone.

Figure 3:
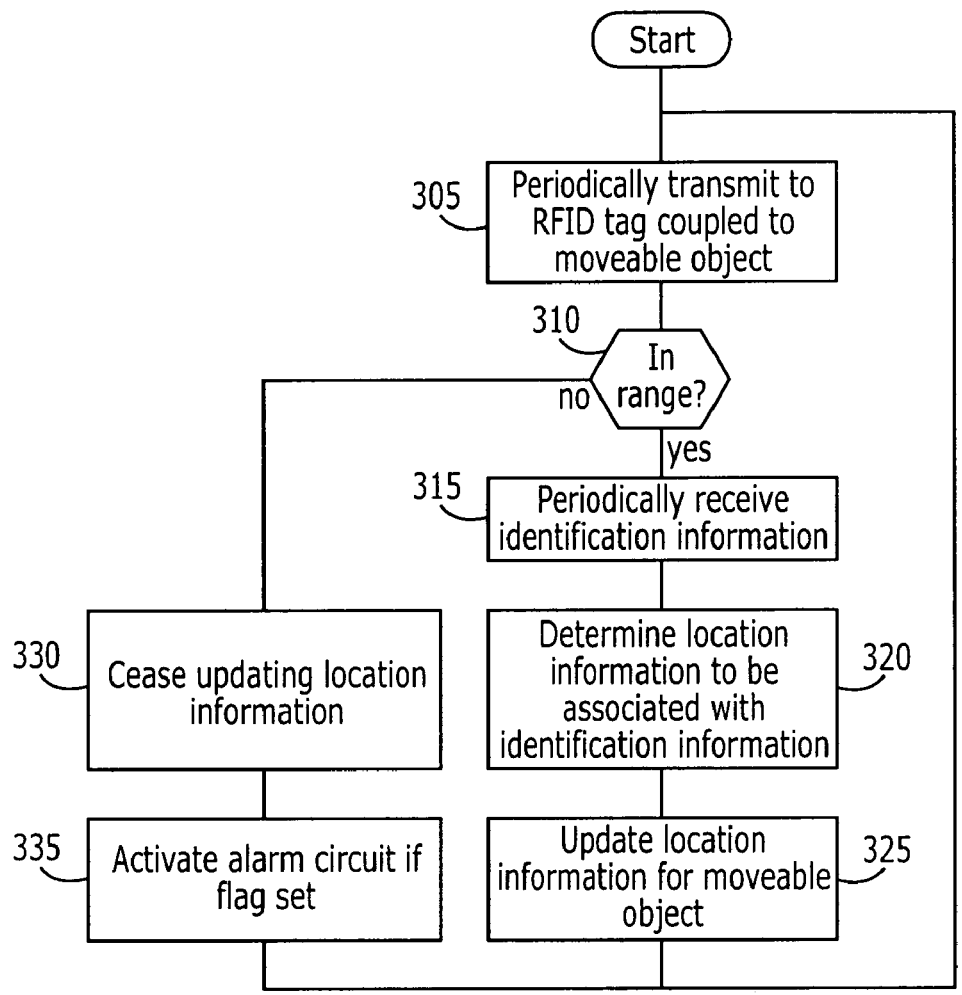
FIG. 3 is a flowchart that illustrates operations of methods, computer program products, and mobile terminals according to some embodiments of the invention.

FIG. 3 is a flowchart that illustrates operations of methods, computer program products, and mobile terminals according to some embodiments of the invention. It will be understood that the blocks illustrated in FIG. 3 represent operations carried out for each of the moveable objects within range of the mobile terminal. For example, if three moveable objects having RFID tags associated therewith are within range of the mobile terminal, the operations illustrated in the blocks of FIG. 3 are carried out for each of the moveable objects.

In operation, embodiments according to the invention can periodically transmit RFID signals via the RFID interface circuit (Block 305). The RFID signals transmitted by the mobile terminal can energize RFID antennas of RFID tags coupled to the moveable objects. In response, the RFID tags transmit the identification information that uniquely identifies the moveable object. For example, an RFID tag can be coupled to a set of car keys so that when the mobile terminal transmits the RFID signal, the RFID tag coupled to the keys responds by transmitting the identification information embedded in the RFID tag (including a code that uniquely identifies the keys).

It will be understood that other personal objects such as a wallet, a briefcase, etc., can be coupled to other RFID tags that each include their own unique identification information to identify the associated moveable object. It will be further understood that the mobile terminal can periodically transmit the RFID signals to the moveable objects according to a predetermined schedule or randomly. In other words, the term "periodically" as used herein is not to be construed as having a strictly defined time period associated therewith.

If the mobile terminal is located within range of the RFID tag (Block 310), the mobile terminal periodically receives the identification information transmitted by the respective moveable object via an RFID signal (Block 315). As described above, the ID information uniquely identifies the moveable object coupled to the RFID tag which transmitted the RFID signal.

The mobile terminal determines location information to be associated with the identification information received from the moveable object (Block 320). For example, in some embodiments according to the invention, location information for the moveable objects can be determined using GPS information as described above in reference to FIG. 2. In other embodiments according to the invention, the location information is determined using network location information provided by the network 10 as described above in reference to FIG. 2. It will be understood that the location information to be associated with the ID information provided by the RFID tag can be equivalent to the location of the mobile terminal itself or, alternatively, may be determined based on the location information and offset therefrom based on analysis of the RFID signal received from the RFID tag. In particular, the range of the moveable object may be estimated by the signal strength of the RFID signal received at the mobile terminal, which can then be used to adjust the location information for the mobile terminal. In some embodiments according to the invention, phase shift analysis of the RFID signal may be employed to determine still further offsets to the location information for the mobile terminal.

The mobile terminal stores the determined location information for each moveable object in a location information table described above in reference to FIG. 2 and below in reference to FIG. 7. Moreover, as the mobile terminal periodically receives identification information from the moveable objects, the new location information determined therefrom is used to update existing location information stored in the location information table (Block 325). Processing may then continue as described above with the periodic re-transmission of the RFID signal (block 305).

If however, the moveable object is not within range of the mobile terminal (Block 310), the mobile terminal ceases updating the location information for the moveable object that is out of range to maintain the updated location information in the location information table as the most recently known location information for the moveable object (Block 330). Furthermore, if the settable/clearable alarm flag in the location information table is in the set state, the alarm circuit is activated (Block 325) so that the user may be alerted to the possibility that the moveable object may have been dropped/misplaced. Alternatively, if the settable/clearable alarm flag associated with the moveable object is the cleared state, no alarm is activated.

It will be understood that the location information determined by the mobile terminal may be determined and maintained separately from the periodic receipt of identification information from the moveable objects. In other words, the mobile terminal may operate the location determination circuit separately from the RFID interface circuit. For example, the location determination circuit may periodically determine the location of the mobile terminal and make the location information available in the memory or a register of the mobile terminal. When the identification is received at the mobile terminal, the location information made available in the memory or the register can be accessed and entered into the location information table in association with the identification information for the moveable object.

It will be further understood that the determination of the location information can be provided on a variable basis, such as every 30 seconds or every minute, depending on the user preference and the available services. It will be further understood that the offsets to the location information provided, for example, by the range or phase analysis described above, may be determined at the time of reception of the identification information and applied to the location information available in the memory or the register.

Figure 4:
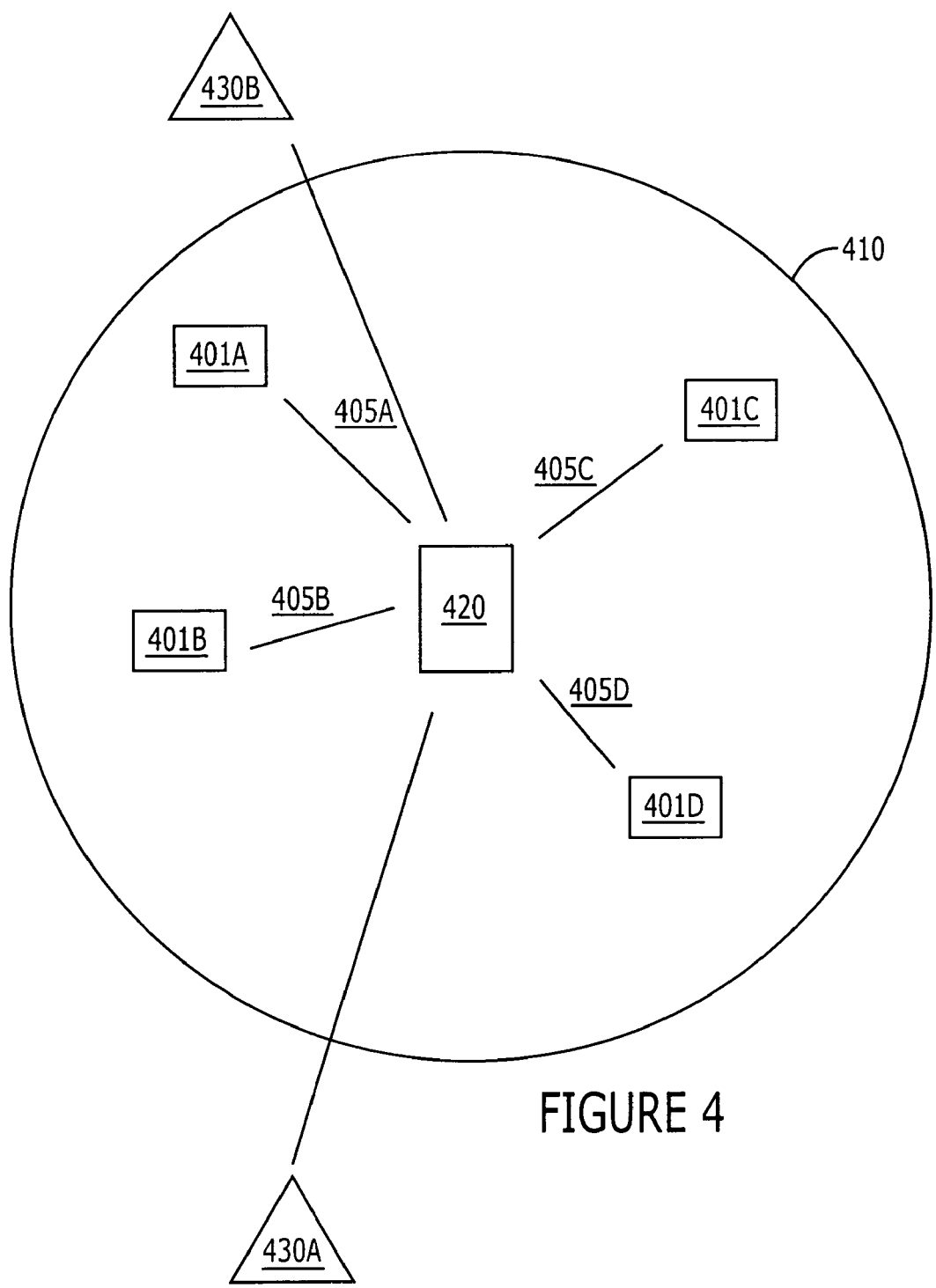
FIGS. 4 and 5 are schematic diagrams that illustrate operations of mobile terminals according to some embodiments of the invention.

FIG. 4 is a schematic diagram that illustrates operations of mobile terminals according to some embodiments of the invention. According to FIG. 4, a plurality of moveable objects 401A-D each include respective RFID tags that are programmed with identification information that uniquely identifies the corresponding moveable object 401A-D. Each of the plurality of moveable objects 401A-D is located within RFID range 410 of a mobile terminal 420. Periodically the mobile terminal 420 transmits an RFID signal that causes each of the plurality of moveable objects 401A-D to transmit an RFID signal 405A-D that is periodically received by the mobile terminal 420. The RFID signal transmitted by the plurality of moveable objects 401A-D includes the identification information that uniquely identifies the corresponding moveable object 401A-D.

Upon receiving the RFID signal including the identification information, the mobile terminal 420 associates location information with the identification information received from the moveable objects 401A-D. In particular, the location information can be determined using network information received from base stations 430A-B and/or a GPS satellite system 274 as described above. As further described above, the mobile terminal 420 may offset GPS information and/or network information by analyzing signal strength or phase shift of the RFID signals received from the plurality of moveable objects 401A-D to provide the location information.

Each time the mobile terminal 420 receives an RFID signal from a moveable object 401A-D, the mobile terminal 420 can associate location information with the recently acquired identification information to provide updated location information, which replaces the existing location information stored in a location information table as described above.

Figure 5:
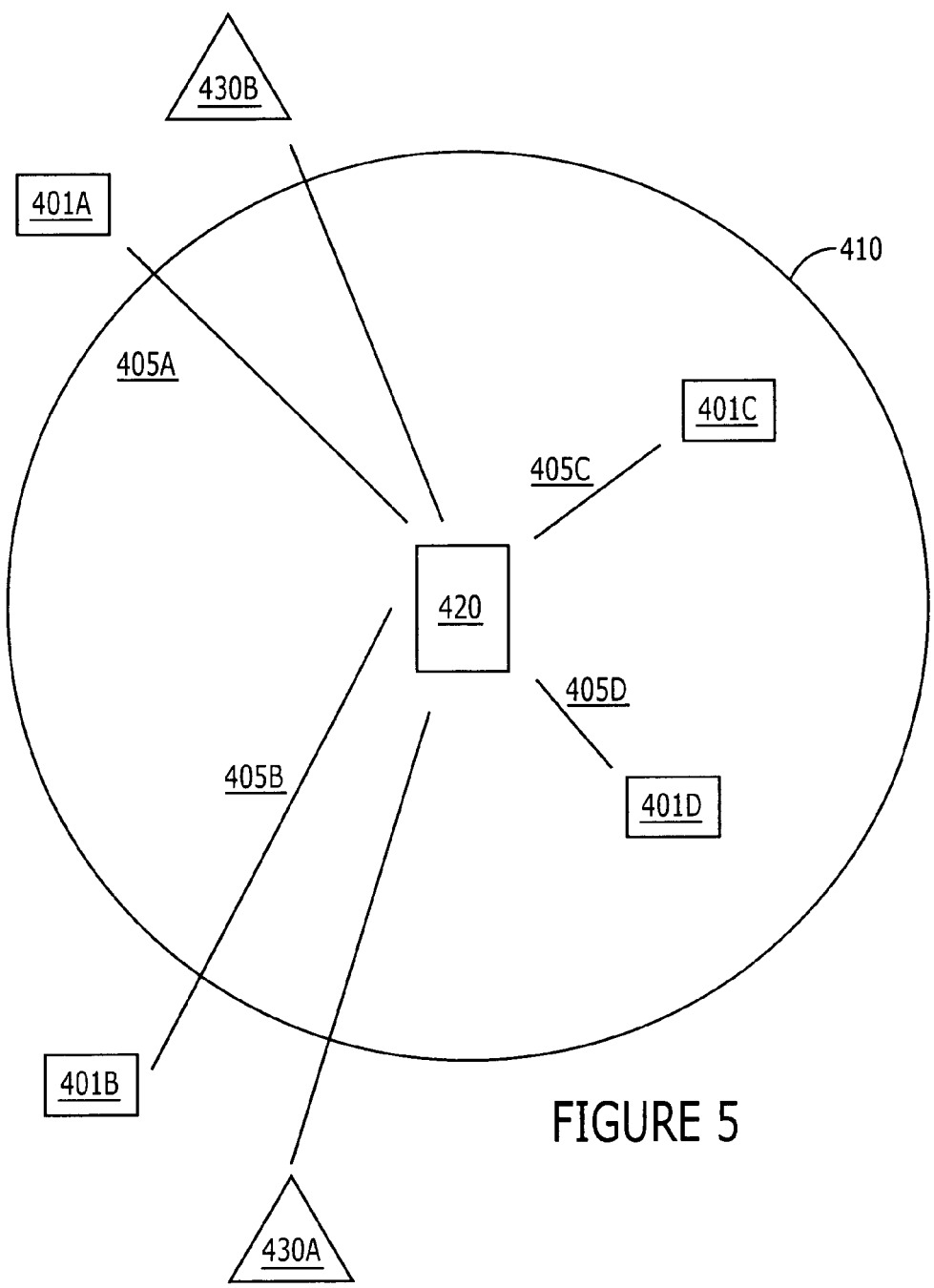

FIG. 5 is a schematic diagram that illustrates further operations of mobile terminals according to some embodiments of the invention. In particular, as shown in FIG. 5 two of the plurality of moveable objects 401A-D have been moved beyond the RFID range 410. When the moveable objects 401A-D are moved beyond the RFID range 410, the mobile terminal 420 ceases to update the location information in the location information table associated with the moveable objects 401A-D to maintain the information stored therein as the most recently known location information for the moveable objects 401A-B. Moreover, the location information can also include a time at which the most recent location information for the moveable object was established. For example, if at a time $T_1$, the mobile terminal received an RFID signal from the moveable object 401A, the location information table would be updated with the determined location information associated therewith as well as the time $T_1$ at which the RFID signal was received. After the moveable object 401A moves beyond the RFID range 410, no further RFID signals may be received from the moveable object 401A. Accordingly, the mobile terminal ceases to update the location information for moveable object 401A so that the previously stored location information and time $T_1$ are maintained as the most recently known location information for the moveable object 401A. However, updated location information may continue to be periodically received from moveable objects 401C-D as long as those moveable objects remain within the RFID range 410.

Still referring to FIG. 5, the mobile terminal 420 can activate an alarm when it is determined that a moveable object has moved beyond the RFID range 410. For example, if the moveable object 401B represents a wallet and the settable/clearable alarm flag in the location information table associated with the wallet is set, the mobile terminal 420 activates the alarm circuit when the wallet moves beyond the RFID signal range 410. The user may wish to place the settable/clearable alarm flag in the set position based on the nature of the moveable object. In the above example describing the moveable object 401B as a wallet, the user may wish to be notified if the wallet moves beyond the RFID range 410. In contrast, if the moveable object 401A represents a car, the user may elect to place the settable/clearable alarm flag associated therewith in the clear state so that no alarm is activated when the car is beyond the RFID range 410. Accordingly, in some embodiments according to the invention, each of the settable/clearable alarm flags in the location information table can be set or cleared independent of the state of other flags.

Figure 6:
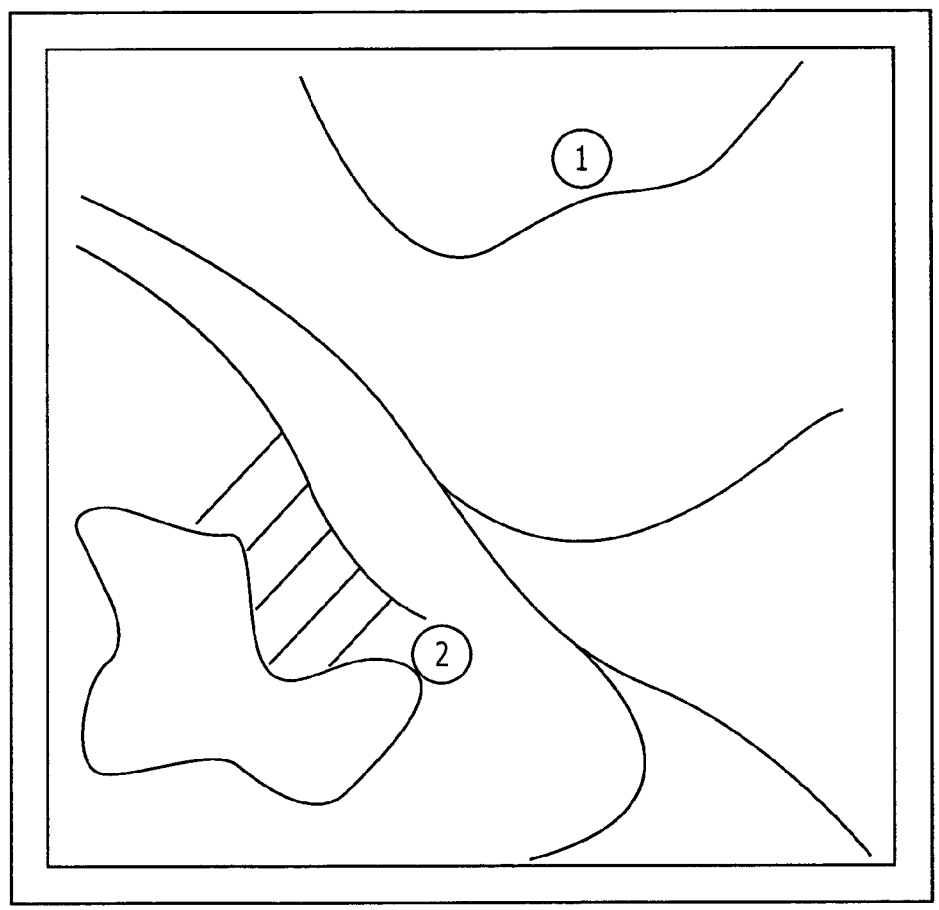
FIG. 6 is a graphical representation of a map provided on a display of a mobile terminal according to some embodiments of the invention.

Accordingly, when a user suspects that a moveable object may have been lost or misplaced, the user can access the location information in the location information table to provide directional information that is based on the most recently known location information for the moveable object which may have been lost. In some embodiments according to the invention, the directional information provided can be a map on a display of the mobile terminal that shows the most recently known location information for the moveable object. An exemplary representation of a map including directional information is shown in FIG. 6. In other embodiments according to the invention, the directional information may be shown as an address which may be determined by referring to a database via the network 10 to translate, for example, GPS information stored in the location information table to an address. The directional information can also include a display of the time at which the most recently known location information for the moveable object was acquired. The user may refer to the time to gain further insight into where the moveable object may have been misplaced or dropped.

In some embodiments according to the invention, the directional information provided on the display of the mobile terminal may include all or some of the moveable objects. In some embodiments according to the invention, the updating of the location information and the storing in the location information table may be selected based on privacy concerns if, for example, the user wishes to temporarily prevent location information associated with selected moveable objects from being displayed.

Figure 7:
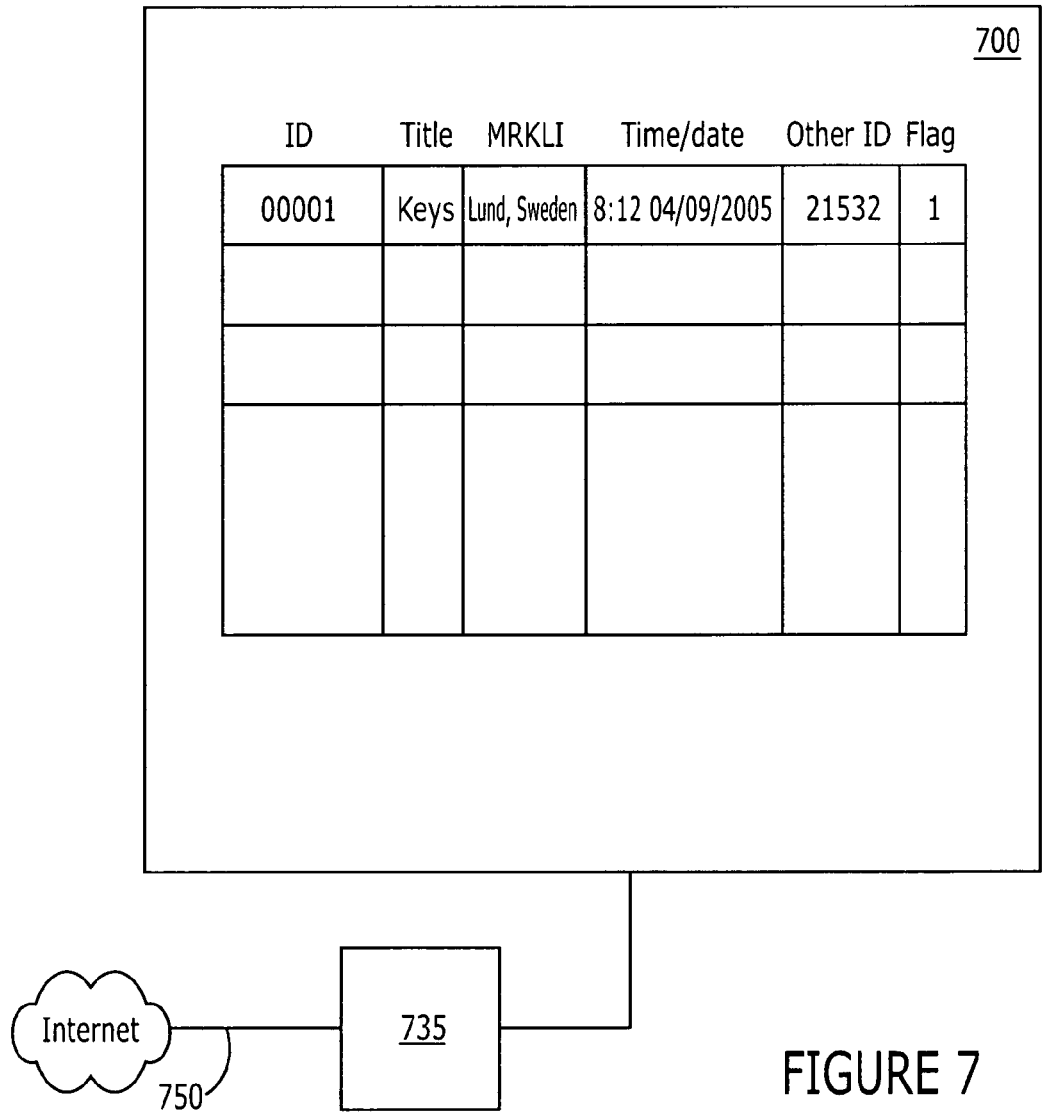
FIG. 7 is a schematic illustration of a location information table provided on a web page according to some embodiments of the invention.

In some embodiments according to the invention as illustrated for example in FIG. 7, the information stored in the location information table can be provided to a server 735 which can serve the information therein as a web page 700 (or computer displayable document) that may be viewed via a network, such as the Internet. It will be understood that access to the web page may be provided by an application service provider (via server 735) that enables the transmission of electronic signals 750 that represent the location information included on the web page 700. As shown in FIG. 7, the location information on the web page 700 can include identification information (ID) that uniquely identifies each of the moveable objects that the user wishes to track. The ID information can be a numeric or alphanumeric code that is stored in the RFID tag and is transmitted to the mobile terminal periodically.

Each of the ID information can have an associated moveable object title (i.e., text) that can be used to as a label on the web page or on the display of the mobile terminal for ease of identification. Each of the moveable objects also has associated most recently known location information (MRKLI) and the time at which the most recently known location information was established. Furthermore, each identification information can have an associated settable/clearable alarm flag which controls whether an alarm is activated if the associated moveable object moves beyond the RFID range associated with the mobile terminal.

In some embodiments according to the invention, the web page 700 can also include identification information for moveable objects owned or associated with someone other than the user of the mobile terminal. For example, the user of the mobile terminal may be a member of a user's group or forum that includes other members or subscribers. The other members or subscribers may share identification information for their respective moveable objects so that the user's mobile terminal can periodically receive the identification information for the others' moveable objects, when within RFID range.

Figure 8:
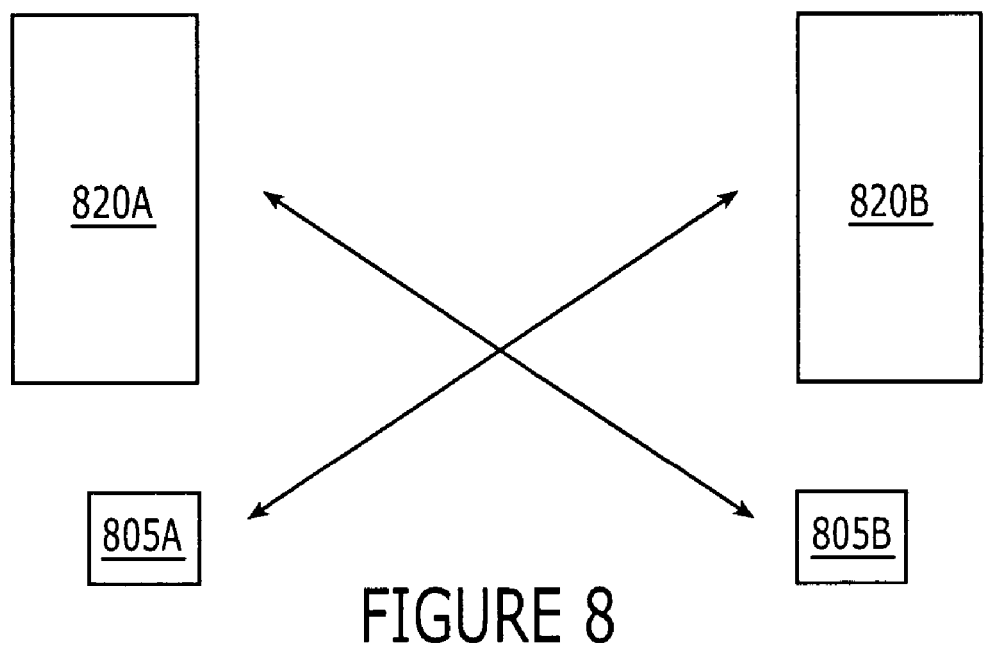
FIG. 8 is a schematic diagram that illustrates operations of mobile terminals according to some embodiments of the invention.

As illustrated in FIG. 8, if another member of the user's group or forum comes within range of the user's mobile terminal 820A/B, the user's mobile terminal 820A/B will periodically receive the identification information associated with the others' moveable object 805A/B and update the location information associated therewith. In response, the mobile terminal 820A/B may activate the alarm to alert the user that a trusted member of the user group or forum is nearby.

In the drawings and specification, there have been disclosed embodiments of the invention and, although specific terms are employed, they are used in a generic and descriptive sense only and not for purposes of limitation, the scope of the invention being set forth in the following claims.

What is claimed:

1. A method of providing directional information associated with moveable objects comprising:
   periodically receiving identification (ID) information at a mobile terminal from a moveable object via a Radio Frequency Identification (RFID) signal;
   updating location information associated with the ID information to provide updated location information for the moveable object;
   ceasing updating the location information when the moveable object is out of RFID range of the mobile terminal to maintain the updated location information as the most recently known location information for the moveable object;
   activating an alarm responsive to ceasing updating the location information if a flag associated with the ID information of the moveable object is set; and
   avoiding activating the alarm responsive to ceasing updating the location information if the flag associated with the ID information of the moveable object is clear.

2. A method according to claim 1 further comprising:
   providing directional information based on the most recently known location information for the moveable object.

3. A method according to claim 2 wherein providing directional information comprises providing a map including the directional information on a display of the mobile terminal.

4. A method according to claim 1 wherein updating location information comprises:
   determining new location information associated with the ID information using Global Position System (GPS) information for the mobile terminal based on the periodically received ID information; and
   updating the location information with the GPS information to provide the updated location information for the moveable object.

5. A method according to claim 1 wherein updating location information comprises:
   determining new location information associated with the ID information using network location information for the mobile terminal based on the periodically received ID information; and
   updating the location information with the GPS information to provide the updated location information for the moveable object.

6. A method according to claim 1 wherein ceasing updating the location information when the moveable object is out of range of the mobile terminal comprises:
   ceasing updating the location information responsive to unplanned placement of the moveable object.

7. A method according to claim 1 wherein updating location information further comprises updating the location information including a time associated with receipt of most recently received location information received from the moveable object.

8. A method according to claim 1 wherein the moveable object comprises one of a plurality of moveable objects having respective unique ID information, the plurality of moveable objects configured to transmit the respective unique ID information to the mobile terminal via RFID signals.

9. A method according to claim 8 further comprising:
   providing a plurality of most recently known location information for the plurality of moveable objects.

10. A method according to claim 9 wherein providing a plurality of most recently known location information comprises providing the plurality of most recently known location information via a web page available via the Internet.

11. A method according to claim 10 wherein another of the plurality of moveable objects comprises the mobile terminal.

12. A method according to claim 1 wherein the moveable object comprises a moveable object associated with someone other than a user of the mobile terminal, the method further comprising:
   activating an alarm responsive to receiving ID information at the mobile terminal from the moveable object via the RFID signal.

13. A computer program product configured to operate according to the method of claim 1.

14. A mobile terminal comprising:
   a mobile terminal transceiver circuit;
   a Radio Frequency Identification (RFID) interface circuit configured to periodically receive identification (ID) information from a moveable object via an RFID signal from moveable objects equipped with RFID tags;
   a processor circuit, coupled to the mobile terminal transceiver circuit, configured to coordinate operation of the mobile terminal including the mobile terminal transceiver circuit and configured to update location information associated with the ID information to provide updated location information for the moveable objects and configured to cease updating the location information when the moveable objects are out of range of the RFID interface circuit to maintain the updated location information as the most recently known location information for the moveable objects; and an alarm circuit, coupled to the processor circuit, configured to activate an alarm responsive to the processor ceasing updating the location information if a flag associated with the ID information of the moveable object is set and configured to avoid activating the alarm responsive to the processor circuit ceasing updating the location information if the flag associated with the ID information of the moveable object is clear.

15. A mobile terminal according to claim 14 further composing:

a display, coupled to the processor circuit, configured to provide directional information thereon based on the most recently known location information for the moveable object.

16. A mobile terminal according to claim 14 wherein updating location information comprises:

a location determination circuit, coupled to the processor circuit, configured to determining new location information associated with the ID information based on the periodically received ID information and configured to update the location information with to provide the updated location information for the moveable object; and a location information table, coupled to the processor circuit, configured to store for the most recently known location information for the moveable objects.

17. A mobile terminal according to claim 16 wherein the location determination circuit comprises a Global Positioning System (GPS) location circuit or a network location circuit.

18. A mobile terminal according to claim 14 wherein the processor is further configured to cease updating the location information when the moveable object is out of range of the RFID circuit responsive to unplanned placement of the moveable objects.

* * * * *

UNITED STATES PATENT AND TRADEMARK OFFICE
CERTIFICATE OF CORRECTION

| | |
|---|---|
| PATENT NO. | : 7,248,167 B2 |
| APPLICATION NO. | : 11/070784 |
| DATED | : July 24, 2007 |
| INVENTOR(S) | : Wassingbo |

It is certified that error appears in the above-identified patent and that said Letters Patent is hereby corrected as shown below:

<u>In The Claims:</u>

Column 13, Claim 15, Line 17:  Please correct "composing:"
To read -- comprising:--

Signed and Sealed this

Ninth Day of October, 2007

JON W. DUDAS
*Director of the United States Patent and Trademark Office*